Sheet 1, 2 Sheets.

O. G. Warren.

Laying Telegraph Cable.

Nº 21,634.　　　　　Patented Sept. 28, 1858.

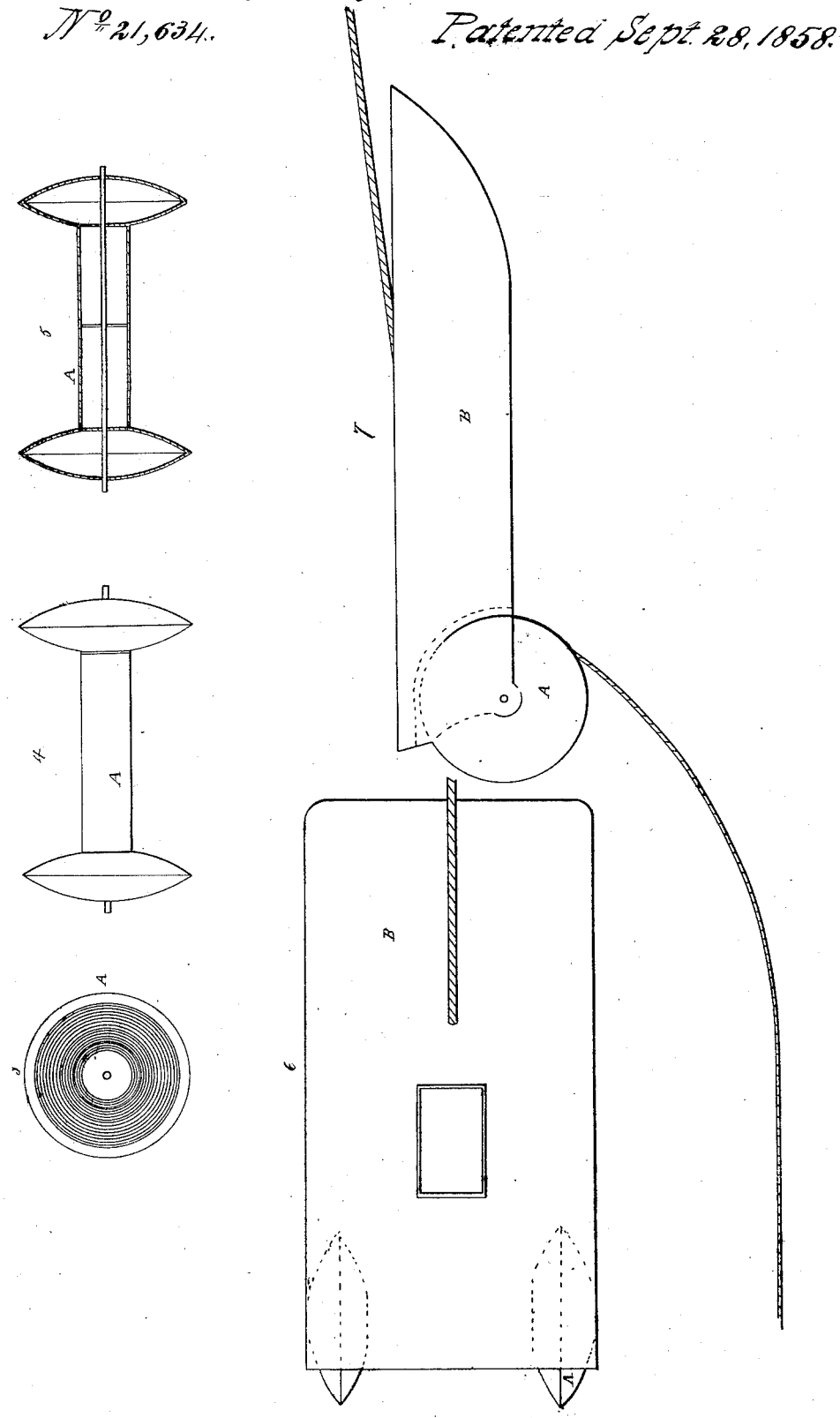

UNITED STATES PATENT OFFICE.

OWEN G. WARREN, OF NEW YORK, N. Y.

IMPROVEMENT IN METHODS OF LAYING SUBMARINE-TELEGRAPH CABLES.

Specification forming part of Letters Patent No. 21,634, dated September 28, 1858.

*To all whom it may concern:*

Be it known that I, OWEN G. WARREN, of the city, county, and State of New York, have invented a new and useful mode and apparatus for laying telegraph-wires at the bottom of the sea; and I hereby declare that the following is a full and exact description thereof.

To enable others to make and use my invention, I proceed to describe its construction and operation, reference being had to the drawings hereunto annexed and making part of this specification.

Figure 1:
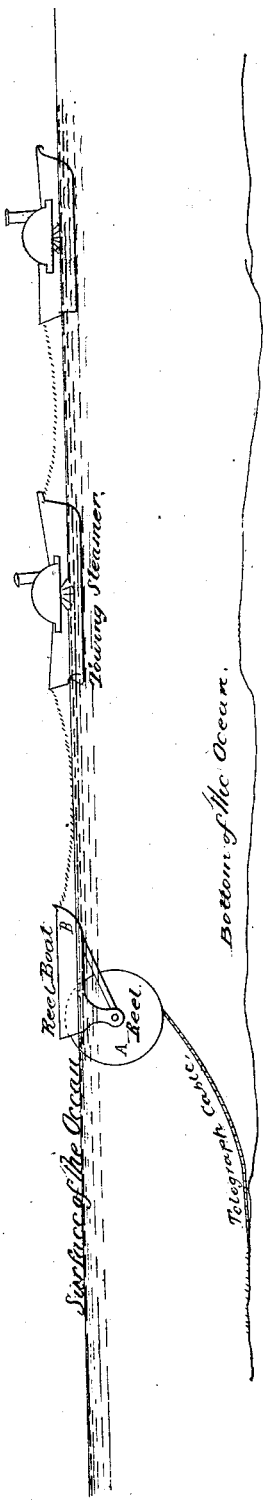
Figure 2:
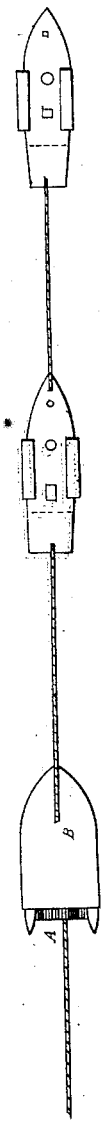

Figure 1 is a sectional view, showing the telegraph-reel (attached to the reel-boat) towed by steamers; Fig. 2, a plan showing the reel-boat and steamers; Fig. 3, a transverse section of the telegraph-reel, showing the cable wound upon it; Fig. 4, a side view of the reel; Fig. 5, a section (longitudinal) of the reel with the axle or shaft running through it; Fig. 6, a plan of the reel-boat, which may be square at the bow on deck, like a scow, as represented, or pointed; Fig. 7, a side of the reel-boat with hawser for towing.

My plan of laying down a telegraphic cable is to wind it upon a reel, A, immersed in the water nearly to the surface, and tow it across the ocean. To this end I would make the cable only so much more than the specific gravity of water as would be requisite to sink it with the necessary rapidity. I would take, for instance, seven telegraph-wires, each coated with gutta-percha, twist them into a rope in one direction and cover them with hempen rope twisted in the opposite direction. This would be heavy enough to sink fast enough. If not, some wires could be intermingled with the rope. The reel I would make either of timber properly coppered, or of boiler-iron hollow. In either case a sufficient buoyancy must be obtained to support the cable above water—that is, the top just out of water—when wound upon it. One end of the cable, being left out at the rim, would be accessible for making signals through the whole length upon stopping the motion of the reel when the end of the cable was out of water. The reel-boat attached would be required for the hands who managed the brakes. I would make it of iron. I would apply any suitable brakes to the rim of the wheel, or, if deemed advisable, I would use a small steam-engine to turn the reel at just such a speed as would be required to deliver the cable, governing the motion of the reel by an indicator, which should show the speed of the boat.

What I claim as my invention, and desire to secure by Letters Patent, is—

1. The use of a reel, A, immersed in the water, to deliver a telegraph-cable at the bottom of the sea, constructed and operated substantially as above described.

2. The combination of the reel-boat B with the reel for the convenience of using the brake or operating-engine in the manner above described.

OWEN G. WARREN.

Witnesses:
 JOHN D. SURTEVENT,
 E. G. THOMAS.